United States Patent

Shiels et al.

(10) Patent No.: US 9,409,378 B2
(45) Date of Patent: Aug. 9, 2016

(54) THERMAL LINER FOR PROTECTIVE GARMENTS

(71) Applicant: PBI Performance Products, Inc., Charlotte, NC (US)

(72) Inventors: Brian P. Shiels, Charlotte, NC (US); Kimberly M. Henry, Charlotte, NC (US)

(73) Assignee: PBI Performance Products, Inc., Charlotte, NC (US)

( * ) Notice: Subject to any disclaimer, the term of this patent is extended or adjusted under 35 U.S.C. 154(b) by 0 days.

(21) Appl. No.: 13/626,179

(22) Filed: Sep. 25, 2012

(65) Prior Publication Data

US 2014/0087129 A1    Mar. 27, 2014

(51) Int. Cl.
 *B32B 5/26* (2006.01)
 *D04H 1/4342* (2012.01)
 (Continued)

(52) U.S. Cl.
 CPC .............. *B32B 5/26* (2013.01); *A41D 31/0022* (2013.01); *A41D 31/0033* (2013.01); *B32B 3/266* (2013.01); *B32B 5/022* (2013.01); *B32B 5/08* (2013.01); *D04H 1/4342* (2013.01);
 (Continued)

(58) Field of Classification Search
 CPC ....... D04H 1/4342; D04H 13/00; D04H 3/16; B32B 3/10; B32B 5/16; B32B 5/26; B32B 5/24; B32B 5/22; B32B 5/022; B32B 5/08; B32B 3/266; B32B 2250/20; B32B 2262/02; B32B 2262/0246; B32B 2262/062; B32B 2307/304; B32B 2307/306; B32B 2307/7265; B32B 2437/00; B32B 2571/00; Y10T 442/659; Y10T 442/696; Y10T 428/24273

USPC ............ 428/131, 920, 921, 220; 2/27, 81, 87, 2/93, 458; 442/381, 414

See application file for complete search history.

(56) References Cited

U.S. PATENT DOCUMENTS

| 4,562,114 A | 12/1985 | Sawanishi et al. |
| 4,849,280 A | 7/1989 | Coombs |

(Continued)

FOREIGN PATENT DOCUMENTS

| WO | WO 99-22619 A1 | 5/1999 |
| WO | WO 01/66193 A1 | 9/2001 |
| WO | WO 2010-135214 A1 | 11/2010 |

OTHER PUBLICATIONS

Olabisi, Olagoke, Handbook of Thermoplastics, 1997, Marcel Dekker, Inc., pp. 177-179.*

(Continued)

*Primary Examiner* — Maria Veronica Ewald
*Assistant Examiner* — Brian Handville
(74) *Attorney, Agent, or Firm* — Hammer & Associates, P.C.

(57) ABSTRACT

A nonwoven for use in a thermal liner for protective apparel includes 1-45 wt % of a first inherently heat resistant fiber excluding an aramid, and a balance of a second heat resistant fiber. The nonwoven excludes wool and has a thickness less than 3 mm and a basis weight of less than 2.9 osy (100 gsm). In another embodiment, the insulating layer for protective apparel includes a nonwoven including an inherently flame resistant fiber and fibers being inherently resistant to moisture absorption. The inherently flame resistant fiber is different from said inherently resistant to moisture absorption fiber. The nonwoven has an equivalent or better thermal protective performance (TPP) and a lower basis weight than an industry standard nonwoven consisting of a nonwoven of para-aramids or meta-aramids or a blend of both.

10 Claims, 1 Drawing Sheet

(51) Int. Cl.
    *D04H 3/16*     (2006.01)
    *B32B 5/02*     (2006.01)
    *B32B 5/08*     (2006.01)
    *B32B 3/26*     (2006.01)
    *A41D 31/00*     (2006.01)
    *D04H 1/492*     (2012.01)
    *D04H 1/495*     (2012.01)
    *D04H 3/11*     (2012.01)

(52) U.S. Cl.
    CPC .............. *D04H 1/492* (2013.01); *D04H 1/495* (2013.01); *D04H 3/11* (2013.01); *D04H 3/16* (2013.01); *B32B 2250/20* (2013.01); *B32B 2262/02* (2013.01); *B32B 2262/0246* (2013.01); *B32B 2262/062* (2013.01); *B32B 2307/304* (2013.01); *B32B 2307/306* (2013.01); *B32B 2307/7265* (2013.01); *B32B 2437/00* (2013.01); *B32B 2571/00* (2013.01); *Y10T 428/24273* (2015.01); *Y10T 442/659* (2015.04); *Y10T 442/696* (2015.04)

(56) References Cited

U.S. PATENT DOCUMENTS

| | | |
|---|---|---|
| 4,937,136 A | 6/1990 | Coombs |
| 5,007,112 A | 4/1991 | Lewis, Jr. et al. |
| 5,136,723 A | 8/1992 | Aldridge et al. |
| 5,236,769 A | 8/1993 | Paire |
| 5,624,738 A | 4/1997 | Barbeau et al. |
| 5,727,401 A | 3/1998 | Statham |
| 5,860,163 A | 1/1999 | Aldridge |
| 5,996,122 A | 12/1999 | Aldridge et al. |
| 6,038,700 A | 3/2000 | Aldridge et al. |
| 6,407,019 B1 | 6/2002 | Schaefer et al. |
| 6,430,754 B1 * | 8/2002 | Taylor et al. ...................... 2/458 |
| 6,489,256 B1 * | 12/2002 | Kent et al. ..................... 442/302 |
| 6,562,741 B1 | 5/2003 | Lilani |
| 6,606,749 B2 | 8/2003 | Underwood et al. |
| 6,743,498 B2 | 6/2004 | Fourmeux |
| 7,013,496 B2 * | 3/2006 | Dunn ............................... 2/458 |
| 7,676,855 B2 | 3/2010 | Dunn |
| 7,854,017 B2 * | 12/2010 | Laton ................... 2/81 |
| 2002/0069453 A1 | 6/2002 | Kelleher et al. |
| 2003/0082972 A1 * | 5/2003 | Monfalcone et al. ......... 442/138 |
| 2007/0137012 A1 | 6/2007 | Laton |
| 2009/0019614 A1 | 1/2009 | Hagihara et al. |
| 2009/0061131 A1 * | 3/2009 | Monfalcone et al. ......... 428/35.6 |
| 2011/0214218 A1 | 9/2011 | Bonamer et al. |
| 2011/0263754 A1 | 10/2011 | Wilson et al. |
| 2012/0034835 A1 | 2/2012 | Hess et al. |
| 2012/0052217 A1 | 3/2012 | Monfalcone, III et al. |

OTHER PUBLICATIONS

Smith, William C., High Performance and High Temperature Resistant Fibers, Sep. 21, 1999, http://www.intexa.com/downloads/hightemp.pdf, pp. 1-17.*
Kilinc, F. Selcen, Handbook of fire resistant textiles, 2013, Woodhead Publishing, pp. 526-527.*
"Honeywell First Responder Products," What's New, Edition 1—FDIC 2012, Honeywell International Inc., (2012).

* cited by examiner

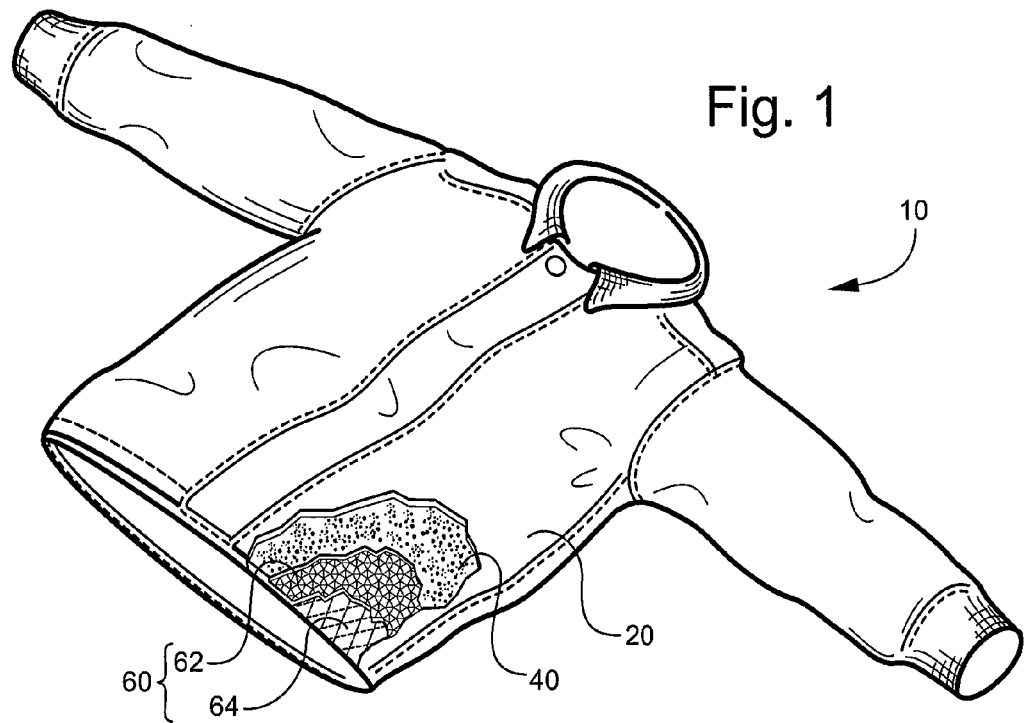
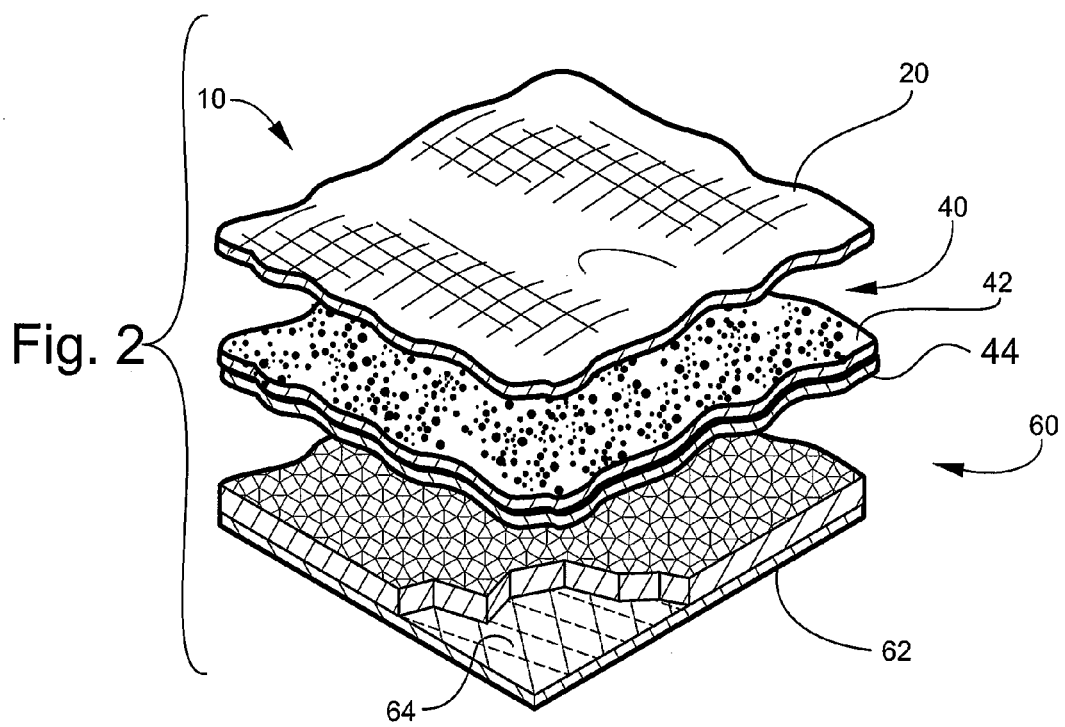

THERMAL LINER FOR PROTECTIVE GARMENTS

FIELD OF THE INVENTION

The instant invention is directed to a thermal liner for use in, for example, protective garments.

BACKGROUND OF THE INVENTION

Protective garments are now well known for many and varied uses, such as suits for industrial workers, firefighters, wildlands firefighters, race car drivers, airplane pilots, and military personnel. Garments include not only complete, full body suits, but also individual garments such as trousers, jackets, gloves, boots, hats, head coverings, masks, etc. Generally, protective garments are designed to shield a wearer from a variety of environmental hazards. Firefighter garments are representative of such protective garments.

Firefighter garments, generally known as turnout gear, are designed primarily to prevent the firefighter from sustaining serious burns. A second significant threat to firefighters is heat stress. More firefighter deaths occur in the United States each year due to heat stress related conditions than due to burns. Heat stress related conditions include elevated body core temperature leading to heat prostration, increased blood pressure, heatstroke, and sometimes heart attack. As this second threat has become recognized, the fire service community has attempted to modify and improve turnout gear to minimize its contribution to heat stress.

Generally, turnout gear includes a coat and overalls. Turnout gear typically comprises three layers: an outer shell, a moisture barrier, and a thermal barrier. The outer shell layer is usually a woven fabric made from flame resistant fibers and is considered the firefighter's first line of defense. Not only should it resist flame, but it needs to be tough and durable so as not to be torn, unduly abraded, or snagged during normal firefighting activities.

The moisture barrier layer, while also flame resistant, is provided to prevent water from penetrating and saturating the turnout gear. Excess moisture from the environment would laden the firefighter with extra weight and therefore increase their load. Such an increase in load is likely to increase the possibility of heat stress.

The thermal barrier liner is also flame resistant and offers the bulk of the thermal protection afforded by the ensemble. A traditional thermal barrier liner includes an insulation layer of flame resistant fibers quilted to a lightweight woven face cloth also made of flame resistant fibers. A material commonly used as a component in the thermal barrier, and often regarded as an industry standard, is known as E89® from DuPont of Richmond, Va. E89 is a spunlaced nonwoven material consisting of NOMEX® (meta-aramid) staple or KEVLAR® (para-aramid) staple or a combination of both, *Technical Guide for NOMEX® Brand Fiber*, H-52720 Revised July 2001 by DuPont, Richmond, Va., page 3.

While E89 is an excellent material, there is a need to find better materials, i.e., materials with the same or better thermal protection and lower weights.

Nonwovens used in thermal layers have been suggested and they are disclosed in U.S. Pat. Nos. 4,937,136, 5,136,723, 5,236,769, 6,430,754, 6,743,498, 7,6768,55, and US Publication 2002/0069453.

U.S. Pat. No. 4,937,136 teaches an inner thermal liner made with a nonwoven fabric of a blend of wool and a synthetic fiber capable of high temperature performance. The synthetic fibers include, among others, NOMEX, KEVLAR, and polybenzimidazole (PBI).

U.S. Pat. No. 5,136,723 teaches an inner thermal barrier made with a mesh (apertured) fabric of NOMEX or KEVLAR having a basis weight of about 2 osy (ounces per square yard) or 67.8 gsm (grams per square meter). This mesh fabric is believed to be E89.

U.S. Pat. No. 5,236,769 teaches textile layer of a nonwoven made with 100% aramids, mixtures of 30-50% wool and heat stable fiber, such as PBI. This nonwoven has a basis weight of 200 gsm (5.9 osy) at a thickness of 4 mm.

U.S. Pat. No. 6,430,754 teaches a second layer of insulating material of 1.5 osy E89 or a spunlaced nonwoven of a blend of aramid and PBI fibers. U.S. Pat. No. 6,430,754 also teaches an alternate embodiment where the thermal barrier has a first layer of 2.3 osy E89 (spunlaced nonwoven) and a second layer of 1.5 osy E89 (spunlaced nonwoven).

U.S. Pat. No. 6,743,498 teaches an insulating barrier of a perforated nonwoven having a basis weight in the range of 100-200 gsm and made from a variety of thermostable fiber including, among others, aramids and PBI.

U.S. Pat. No. 7,676,855 teaches an insulation layer of a nonwoven made of, among other things, aramids or melamines (but no PBI), the nonwoven maybe hydroentangled, and the basis weight of the nonwoven may be in the range of 0.75-8 osy. In the exemplary examples, the nonwoven is 2.5 osy and made of 50% BASOFIL® melamine/25% meta-aramid/25% para-aramid.

US Publication 2002/0069453 teaches the insulation layer comprising a blend of inherently hydrophobic fibers and non-hydrophobic, flame resistant fibers. The hydrophobic fibers include polytetrafluoroethylene (PTFE) fibers. The non-hydrophobic fibers include aramid fibers, PBI fibers, polybenzoxazole (PBO) fibers, melamine fibers, and blends thereof.

SUMMARY OF THE INVENTION

A nonwoven for use in a thermal liner for protective apparel includes 1-45 wt % of a first inherently heat resistant fiber excluding an aramid, and a balance of a second heat resistant fiber. The nonwoven excludes wool and has a thickness less than 3 mm and a basis weight of less than 2.9 osy (100 gsm). In another embodiment, the insulating layer for protective apparel includes a nonwoven including an inherently flame resistant fiber and fibers being inherently resistant to moisture absorption. The inherently flame resistant fiber is different from said inherently resistant to moisture absorption fiber. The nonwoven has an equivalent or better thermal protective performance (TPP) and a lower basis weight than an industry standard nonwoven consisting of a nonwoven of para-aramids or meta-aramids or a blend of both.

DESCRIPTION OF THE DRAWINGS

For the purpose of illustrating the invention, there is represented in the figures data from various embodiments of the invention; it being understood, however, that this invention is not limited to the data shown and that this data is not necessarily been optimized, but instead only indicates the possibilities for the inventive materials.

FIG. 1 is an illustration of a protective garment, parts broken away.

FIG. 2 is an exploded view of the layers of the protective garment shown in FIG. 1.

DESCRIPTION OF THE INVENTION

Referring to the Figures, wherein like numerals refer to like elements, there is shown in FIG. 1, a protective garment 10.

Specifically, protective garment 10 is the jacket of a firefighter's turnout suit. It is understood, however, that the invention is not limited to firefighter's turnout gear. The invention may be used in other types of protective gear, as will be apparent to those of ordinary skill. Such other types of protective suits include, but are not limited to, suits for industrial workers (including, for example, arc flash apparel), wildlands firefighters, race car drivers, airplane pilots, military personnel, and the like.

As indicated in FIGS. 1 and 2, the protective garment 10 may have a multi-layer construction that includes an outer shell 20, a moisture barrier 40, and a thermal liner 60. The outer shell 20 is typically constructed of a flame and abrasion resistant material that comprises flame resistant fibers made of, for example, aramid (meta- and/or para-aramid), polybenzimidazole (PBI), polybenzoxazole (PBO), melamine, or the like, and blends thereof. The outer shell 20 may be treated with a water-resistant finish (for example, a perfluorohydrocarbon) to prevent or reduce water absorption from the outside environment. The weight of the outer shell material may be within the range of about 6-8 ounces per square yard (osy).

The moisture barrier 40 may be constructed of a nonwoven or woven flame resistant fabric 42 comprising flame resistant fibers made of, for example, aramid (meta- and/or para-aramid), polybenzimidazole (PBI), polybenzoxazole (PBO), melamine, or the like, and blends thereof. The moisture barrier 40 may be laminated with a water-impermeable layer 44 of material such as, for instance, a layer of polytetrafluoroethylene (PTFE) or polyurethane (PU). When such an impermeable layer 44 is provided, it usually is provided on the moisture barrier 40, so as to face the thermal liner 60. The weight of the moisture barrier material is typically within the range about 4-6 osy.

The thermal liner 60 may, optionally, include both an insulation layer 62 and a facecloth layer 64, which may be quilted together. In alternative embodiments, however, the insulation layer 62 alone may be used. The insulation layer 62 is discussed in greater detail below. When it is used, the facecloth layer 64 may be constructed of woven material comprising flame resistant fibers made of, for example, aramid (meta-aramid or para-aramid), polybenzimidazole (PBI), polybenzoxazole (PBO), melamine, flame resistant (FR) cellulosics, modacrylic, carbon, or the like, and blends thereof. The facecloth layer 64 may be, optionally, finished with a hydrophilic finish that draws perspiration off of the firefighter's body, if desired. The weight of the facecloth layer material is normally in the range of about 1-6 osy.

The insulation layer 62 comprises a nonwoven material that comprises a plurality of flame resistant fibers, discussed in greater detail below. The insulation layer 62 may comprise a single layer of nonwoven, or two layers of nonwoven, or multiple layers of nonwoven. In one embodiment, the insulation layer has two layers of nonwoven material, and each of these layers may have a different basis weight. The nonwoven material may be a weight range of about 0.75-8 osy. In one embodiment, the nonwoven material may be in a weight range of about 1.0-3.0 osy. In another embodiment, the nonwoven material may be in a weight range of 1.2-2.5 osy. In yet another embodiment, the nonwoven material may be in a weight range of 1.2-2.0 osy. In still another embodiment, the insulation layer may comprise two nonwoven layer, one layer having a basis weight of about 1.4 osy and the other layer having a basis weight of about 1.8 osy. In one embodiment, the nonwoven material may have a thickness of less than 3 mm. In another embodiment, the nonwoven material may have a thickness of less than 2 mm. In yet another embodiment, the nonwoven material may have a thickness of less than 1 mm. The nonwoven material, in all embodiments, should have a minimum thickness of 0.25 mm. In still another embodiment, the nonwoven material may have a thickness in the range of about 0.75-1.25 mm. The nonwoven material may be made by any nonwoven process. Such processes include, but are not limited to, wet laid, air laid, carding, felting, needlepunching, and hydroentangling (spunlaced). In one embodiment, the nonwoven may be spunlaced. The nonwoven material may be flat (i.e., without apertures), apertured (see U.S. Pat. No. 5,136,723 incorporated herein by reference), dimpled (see U.S. Pat. No. 7,676,855 incorporated herein by reference), or a combination of any of the foregoing.

The nonwoven may comprise a plurality of flame resistant fibers. The nonwoven may exclude any wool and/or cellulosic fibers and/or natural fibers (i.e., any non-synthetic or non-man-made fibers). The nonwoven may be characterized has having an equivalent or better thermal protective performance (TPP per NFPA 1971 (2007)) and a lower basis weight than an industry standard nonwoven consisting of a nonwoven of para-aramids or meta-aramids or a blend of both, for example—E89.

In one embodiment, the flame resistant fibers may also be characterized as non-water absorbing fibers. Non-water absorbing fiber does not refer to the moisture regain of the fiber. Moisture regain, as used herein, refers to percentage of atmospheric moisture in a textile material brought into equilibrium with a standard atmosphere after partial drying, calculated as a percentage of the moisture-free weight. Instead, non-water absorbing fiber refers to the fibers ability, when placed in contact with liquid water, to swell, absorb, and retain that water. The water absorbency of fibers may be measured according to ASTM D2402 (2012). The maximum water retention that may be tolerated is about 15%, preferably about 10% or below.

In one embodiment, the nonwoven material comprises a first inherently heat resistant fiber and a second heat resistant fiber. The first fiber may be different from the second fiber. The first heat resistant fiber may comprise 1-45 wt % of the nonwoven and the balance may be the second fiber. The first heat resistant fiber may comprise 10-40 wt % of the nonwoven and the balance may be the second fiber. The first heat resistant fiber may comprise 15-30 wt % of the nonwoven and the balance may be the second fiber.

The first inherently heat resistant fiber of the nonwoven material may selected from the group consisting of polybenzimidazoles, polyamideimides, polyetherimides, polyacrylates, aromatic copolyimides, polyacrylonitriles, polyetherketones, polysulfones, polyethersulfones, melamines, polybenzoxazole, and combinations thereof. In one embodiment, the first inherently heat resistant fiber may be selected from the group consisting of polybenzimidazoles, melamines, polybenzoxazole, and combinations thereof. In another embodiment, the first inherently heat resistant fiber may be selected from the group consisting of polybenzimidazoles, polybenzoxazole, and combinations thereof. The first inherently heat resistant fiber may exclude aramids and/or melamines.

The second heat resistant fiber of the nonwoven material may be selected from the group of aramids (meta- and/or para-aramids), polybenzimidazoles, polyamideimides, polyetherimides, polyacrylates, aromatic copolyimides, polyacrylonitriles, polyetherketones, polysulfones, polyethersulfones, melamines, polybenzoxazole, and combinations thereof. The second heat resistant fiber of the nonwoven material may be selected from the group of aramids (meta- and/or para-aramids), melamines, polybenzoxazole, and combinations thereof. The second heat resistant fiber of the nonwoven material may be selected from the group of meta-aramids, para-aramids, and combinations thereof. The second fiber may exclude FR cellulosics.

EXAMPLES

The following examples further illustrate the invention; it being understood, however, that this invention is not limited to the precise formulations set forth.

In Table 1, there are shown several representative embodiments of the instant invention compared to the certain industry standard materials. These embodiments illustrate a range of thickness and basis weights that may be useful in the manufacture of turnout gear. Fiber blends A-B represent the inventive embodiments and fiber blend C represents an industry standard material.

TABLE 1

| Fiber Blend | Structure | Basis Weight (gsm) [osy] | Thickness (mm) | (mm/gsm) · 100 |
|---|---|---|---|---|
| A | Apertured | 56.9 [1.68] | 0.89 | 1.56 |
| A | Apertured | 66.5 [1.96] | 0.97 | 1.46 |
| A | Apertured | 84.6 [2.50] | 1.10 | 1.30 |
| B[1] | Apertured | 48.1 [1.42] | 0.74 | 1.54 |
| B[1] | Apertured | 62.0 [1.83] | 0.93 | 1.50 |
| B | Apertured | 77.7 [2.29] | 1.07 | 1.38 |
| B | Apertured | 85.0 [2.50] | 1.19 | 1.40 |
| C[2] | Flat | 50.0 [1.47] | 0.70 | 1.40 |
| C[3] | Flat | 80.0 [2.36] | 0.87 | 1.09 |
| C | Dimpled | 80.0 [2.36] | 1.22 | 1.53 |

A: 47 wt % m-aramid/33% p-aramid/20% PBI
B: 80 wt % m-aramid/20% PBI
C: 67 wt % m-aramid/33% p-aramid
Apertured: spunlaced nonwoven with apertures, US513723 incorporated herein by reference.
Flat: spunlaced nonwoven without apertures.
Dimples: spunlaced nonwoven without apertures but having dimples, U.S. Pat. No. 7,676,855 incorporated herein by reference. Also referred to in the industry as '3D.'
Conversion: (gsm/33.9) = osy.
[1]Exemplary embodiment.
[2]Industry standard - 1.5 osy spunlace.
[3]Industry standard - 2.3 osy spunlace.

In TABLE 2, there are shown several full composite comparisons of the instant invention industry standards. The full composite refers turnout gear with an outer shell, moisture barrier, and a thermal liner. The outer shell was PBI MATRIX® available from Safety Components, Inc of Greenville, S.C. The moisture barrier was CROSSTECH 2C available from W.L. Gore & Associates of Elkton, Md. The thermal barrier was unquilted and made with a NOMEX face cloth and the insulation layers set forth in TABLE 2. The first two listed materials are existing industry standard constructions and the remaining are examples of the instant invention.

TABLE 2

| Fiber Blend | Insulation Layers | Full Composite basis Weight (osy) | TPP[4] | TPP/osy |
|---|---|---|---|---|
| 33 wt % p-aramid/ 67% m-aramid[1] | 1.5 osy flat 2.3 osy flat | 19.99 | 35.5 | 1.78 |
| 33 wt % p-aramid/ 67% m-aramid[2] | 1.5 osy flat 2.3 osy dimpled | 19.55 | 36.4 | 1.86 |
| 20 wt % PBI/ 80% m-aramid[3] | 1.4 osy apertured 1.8 osy apertured | 18.89 | 36.2 | 1.92 |
| 47 wt % m-aramid/ 33% p-aramid/20% PBI | 1.7 osy apertured 1.7 osy apertured | 18.95 | 34.7 | 1.83 |

TABLE 2-continued

| Fiber Blend | Insulation Layers | Full Composite basis Weight (osy) | TPP[4] | TPP/osy |
|---|---|---|---|---|
| 47 wt % m-aramid/ 33% p-aramid/20% PBI | 2.0 osy apertured 1.7 osy apertured | 19.27 | 36.7 | 1.90 |
| 20 wt % PBI/ 80% m-aramid | 1.4 osy apertured 2.3 osy apertured | 19.39 | 37.2 | 1.92 |
| 20 wt % PBI/ 80% m-aramid | 1.8 osy apertured 1.8 osy apertured | 19.41 | 36.6 | 1.89 |

Apertured: spunlaced nonwoven with apertures, US513723 incorporated herein by reference.
Flat: spunlaced nonwoven without apertures.
Dimples: spunlaced nonwoven without apertures but having dimples, U.S. Pat. No. 7,676,855 incorporated herein by reference.
[1]Industry standard
[2]Industry standard
[3]Exemplary embodiment
[4]TPP—Thermal Protection Performance per NFPA1971 (2007).

In TABLE 3A-D, there is shown several full composite comparisons of the instant invention to various industry standard full composites. The full composite refers turnout gear with an outer shell, moisture barrier, and a thermal liner. The outer shell was varied as indicated. The moisture barrier was varied as indicated. The thermal barrier was quilted and varied as indicated.

TABLE 3A
Outer Shell: PBI MATRIX - Safety Components, Inc, Greenville, SC.
Moisture barrier - CROSSTECH Black, W.L. Gore & Associates, Elkton, MD.

| Thermal Liner | Fiber Blend | Insulation Layers | TPP[3] | TPP/osy |
|---|---|---|---|---|
| Glide Araflo[1] | 33 wt % p-aramid/ 67% m-aramid | 1.5 osy apertured 2.3 osy flat | 38.9 | 1.93 |
| Glide E89[1] | 33 wt % p-aramid/ 67% m-aramid | 1.5 osy flat 2.3 osy flat | 37.6 | 1.87 |
| Caldura SL2[2] | 33 wt % p-aramid/ 67% m-aramid | 1.5 osy flat 2.3 osy flat | 37.6 | 1.90 |
| Quantum 3D[2] | 33 wt % p-aramid/ 67% m-aramid | 1.5 osy flat 2.3 osy dimpled | 41.8 | 2.10 |
| Glide[1] w/invention | 20 wt % PBI/ 80% m-aramid | 1.4 osy apertured 1.8 osy apertured | 39.3 | 1.90 |

Apertured: spunlaced nonwoven with apertures, US513723 incorporated herein by reference.
Flat: spunlaced nonwoven without apertures.
Dimples: spunlaced nonwoven without apertures but having dimples, U.S. Pat. No. 7,676,855 incorporated herein by reference.
[1]Available from Safety Components, Inc, Greenville, SC.
[2]Available from TenCate, Union City, GA.
[3]TPP—Thermal Protection Performance per NFPA1971 (2007).

TABLE 3B
Outer Shell: PBI MAX - Safety Components, Inc, Greenville, SC.
Moisture barrier - CROSSTECH Black, W.L. Gore & Associates, Elkton, MD.

| Thermal Liner | Fiber Blend | Insulation Layers | TPP[3] | TPP/osy |
|---|---|---|---|---|
| Glide Araflo[1] | 33 wt % p-aramid/ 67% m-aramid | 1.5 osy apertured 2.3 osy flat | 39.2 | 2.10 |
| Glide E89[1] | 33 wt % p-aramid/ 67% m-aramid | 1.5 osy flat 2.3 osy flat | 39.7 | 2.07 |
| Quantum 3D[2] | 33 wt % p-aramid/ 67% m-aramid | 1.5 osy flat 2.3 osy dimpled | 42.2 | 2.16 |
| Glide[1] w/invention | 20 wt % PBI/ 80% m-aramid | 1.4 osy apertured 1.8 osy apertured | 43.4 | 2.20 |

Apertured: spunlaced nonwoven with apertures, US513723 incorporated herein by reference.
Flat: spunlaced nonwoven without apertures.
Dimples: spunlaced nonwoven without apertures but having dimples, U.S. Pat. No. 7,676,855 incorporated herein by reference.

[1] Available from Safety Components, Inc, Greenville, SC.
[2] Available from TenCate, Union City, GA.
[3] TPP—Thermal Protection Performance per NFPA1971 (2007).

TABLE 3C

Outer Shell: GEMINI - TenCate, Union City, GA.
Moisture barrier - CROSSTECH Black, W.L. Gore & Associates, Elkton, MD.

| Thermal Liner | PTKMFiber Blend | Insulation Layers | TPP[3] | TPP/osy |
|---|---|---|---|---|
| Caldura SL2[1] | 33 wt % p-aramid/ 67% m-aramid | 1.5 osy flat 2.3 osy flat | 36.4 | 1.93 |
| Glide[2] w/invention | 20 wt % PBI/ 80% m-aramid | 1.4 osy apertured 1.8 osy apertured | 39.7 | 2.03 |

Apertured: spunlaced nonwoven with apertures, US513723 incorporated herein by reference.
Flat: spunlaced nonwoven without apertures.
[1] Available from TenCate, Union City, GA.
[2] Available from Safety Components, Inc, Greenville, SC.
[3] TPP—Thermal Protection Performance per NFPA1971 (2007).

TABLE 3D

Outer Shell: GEMINI XT - TenCate, Union City, GA.
Moisture barrier - CROSSTECH Black, W.L. Gore & Associates, Elkton, MD.

| Thermal Liner | Fiber Blend | Insulation Layers | TPP[3] | TPP/osy |
|---|---|---|---|---|
| Caldura SL2[1] | 33 wt % p-aramid/ 67% m-aramid | 1.5 osy flat 2.3 osy flat | 38.2 | 1.97 |
| Quantum 3D[1] | 33 wt % p-aramid/ 67% m-aramid | 1.5 osy flat 2.3 osy dimpled | 41.3 | 2.00 |
| Glide[2] w/invention | 20 wt % PBI/ 80% m-aramid | 1.4 osy apertured 1.8 osy apertured | 40.3 | 2.03 |

Apertured: spunlaced nonwoven with apertures, US513723 incorporated herein by reference.
Flat: spunlaced nonwoven without apertures.
Dimples: spunlaced nonwoven without apertures but having dimples, U.S. Pat. No. 7,676,855 incorporated herein by reference.
[1] Available from TenCate, Union City, GA.
[2] Available from Safety Components, Inc, Greenville, SC.
[3] TPP—Thermal Protection Performance per NFPA1971 (2007).

The present invention may be embodied in other forms without departing from the spirit and the essential attributes thereof, and, accordingly, reference should be made to the appended claims, rather than to the foregoing specification, as indicating the scope of the invention.

We claim:

1. A thermal liner for protective apparel comprising: a nonwoven having
   1-45 wt % of a polybenzimidazole fiber, and
   the remaining balance being a second heat resistant fiber, said second fiber being selected from the group consisting of polyamideimides, polyetherimides, polyacrylates, aromatic copolyimides, polyacrylonitriles, polyetherketones, polysulfones, polyethersulfones, melamines, polybenzoxazole, and combinations thereof,
   the nonwoven excluding wool and cellulosic fibers, and having a thickness less than 3 mm and a basis weight of less than 2.9 osy (100 gsm).

2. The thermal liner of claim 1 wherein the first inherently heat resistant fiber and the second heat resistant fiber have a water retention of less than 15%.

3. The thermal liner of claim 1 wherein the protective apparel being a firefighter's turnout gear.

4. The thermal liner of claim 1 wherein said nonwoven being a spunlaced nonwoven.

5. The thermal liner of claim 1 wherein said nonwoven being an apertured nonwoven.

6. The thermal liner of claim 1 wherein said nonwoven comprises 10-40 wt % of said first inherently heat resistant fiber.

7. The thermal liner of claim 1 wherein said nonwoven comprises 15-30 wt % of said first inherently heat resistant fiber.

8. The thermal liner of claim 1 further comprising a facing fabric affixed to said nonwoven.

9. The thermal liner of claim 1 further comprising multiple nonwovens.

10. A protective garment comprising the nonwoven of claim 1.

* * * * *